United States Patent [19]

Harris

[11] Patent Number: 4,907,738
[45] Date of Patent: Mar. 13, 1990

[54] HEAT PUMP

[75] Inventor: Kenneth J. Harris, Mentor, Ohio

[73] Assignee: Conserve, Inc., Erie, Pa.

[21] Appl. No.: 762,550

[22] Filed: Aug. 2, 1985

Related U.S. Application Data

[63] Continuation of Ser. No. 652,286, Sep. 20, 1984, abandoned.

[51] Int. Cl.⁴ .......................................... G05D 23/00
[52] U.S. Cl. .................... 237/2 B; 62/238.6; 62/323.1
[58] Field of Search ............... 237/2 B, 12.1; 62/238.6, 235.1, 323.1, 500, 506; 126/427

[56] References Cited

U.S. PATENT DOCUMENTS

| | | | |
|---|---|---|---|
| 2,150,993 | 3/1939 | Smith | 62/506 |
| 4,213,563 | 7/1980 | Van Kuijk | 237/2 B |
| 4,254,636 | 3/1981 | Zebuhr | 62/238.6 X |
| 4,264,826 | 4/1981 | Ullmann | 237/12.1 |
| 4,385,725 | 5/1983 | Pischlinger | 237/12.1 |
| 4,408,715 | 10/1983 | Gueneau | 237/2 B |
| 4,459,816 | 7/1984 | Lung et al. | 62/183 |
| 4,479,365 | 10/1984 | Holmes | 62/238.6 |
| 4,517,799 | 5/1985 | Hanaoka et al. | 62/323.1 |
| 4,523,438 | 6/1985 | Curti | 62/238.6 |

FOREIGN PATENT DOCUMENTS

| | | | |
|---|---|---|---|
| 41352 | 5/1981 | European Pat. Off. | 237/2 B |
| 3019968 | 12/1981 | Fed. Rep. of Germany | 237/2 B |
| 2032602 | 5/1960 | United Kingdom | |
| 2059563 | 4/1961 | United Kingdom | |
| 1050812 | 12/1966 | United Kingdom | |
| 2066440 | 11/1979 | United Kingdom | 237/2 B |

Primary Examiner—Henry A. Bennet
Attorney, Agent, or Firm—Renner, Otto, Boisselle & Sklar

[57] ABSTRACT

A heat pump installation for substantial heat extraction from an internal combustion engine has a heat pump for extracting waste heat such as from air drawn over the engine and a generator enclosed in a common housing and also extracts heat from the engine exhaust gases either by direct heat exchange in a tank or by means of a specially adapted evaporator coil exposed to the exhaust gas stream. The heat pump installation includes a compressor and condenser which are positioned in a liquid bath.

15 Claims, 5 Drawing Sheets

HEAT PUMP

This is a continuation of co-pending application Ser. No. 652,286 filed on Sept. 20, 1984, abandoned.

BRIEF SUMMARY OF THE INVENTION

This invention relates to heat pump installations.

A heat pump absorbs "low grade" heat at a relatively low temperature and converts it into "high grade" heat at a relatively high temperature. The heat transfer is accomplished by the performance of work in a compressor acting upon refrigerant flowing in a closed circuit between the low grade heat source and the high grade heat output.

It is characteristic of all heat pumps that as the temperature of the low grade source decreases, the overall performance of the heat pump falls. This invention seeks to provide a heat pump installation having a low grade heat source of relatively high temperature affording a stabilized and efficient heat input, for the economic production of useful heat or work.

About 65% of the energy input to an internal combustion engine is lost in the form of heat, and this heat is commonly dissipated uselessly by means of an air cooled radiator or by direct air flow. The object of the present invention is to utilize at least some of this heat as the low-grade source for a heat pump.

According therefore to the invention there is provided a heat pump installation utilizing as a source of low-grade heat waste heat generated by an internal combustion engine.

In a preferred embodiment of the invention the internal combustion engine is arranged in heat exchange relationship with an evaporator coil forming part of the heat pump.

The heat pump installation preferably includes as a source of low-grade heat, a neat exchanger arranged to extract heat from the exhaust gases of the internal combustion engine. Preferably, the exhaust gases of the internal combustion engine are ducted through a water-filled tank constituting the said heat exchanger. In one embodiment, the exhaust gases are ducted through an upper part of the water-filled tank, the lower part of which houses a condenser and compressor of the heat pump.

In a self-contained embodiment of the invention, the engine drives an electrical generator. The generator may in turn supply an electric drive motor of the heat pump compressor.

The water-filled tank and the internal combustion engine may be enclosed by thermally insulating material contained in a common housing.

A substantial proportion, typically 60%, of the waste heat produced by an internal combustion engine is discharged through the exhaust system. Accordingly, in a preferred embodiment of the invention, the engine exhaust gases pass through a heat exchanger tank to heat water therein, the heat pump having an evaporator coil in heat exchange relation with the water in the tank.

Where the engine has a liquid coolant circuit this typically accounts for about 14% of the waste heat generated. The installation preferably, therefore, includes a dissipation coil immersed in the heat exchanger tank.

The present invention also comprehends, for the purpose of extracting heat from the engine exhaust gases, an evaporator coil of finned tubing located in a chamber through which the engine exhaust gases pass, for the purpose of collecting heat from the exhaust gases and reducing their temperature. Preferably, the chamber is surrounded by a liquid-filled annular duct in which a second evaporator coil is located, which coil forms part of a second heat pump independent of the heat pump associated with the first evaporator coil.

The closed refrigerant circuit of the heat pump may include, in a water-filled heat pump tank separate from the heat exchanger tank, a condenser coil and a motor-driven compressor unit. The heat exchanger tank, (the heat pump tank) and the internal combustion engine may all be surrounded by thermally insulating material contained in a common housing.

The heat pump may, in an alternative embodiment of the invention, include an air-cooled evaporator coil arranged adjacent the engine and impeller means are provided to establish an air flow over the engine and over the evaporator coil downstream of the engine.

In an alternative embodiment of the invention, the heat pump has a compressor enclosed in a housing and a condenser in the form of a coil surrounding the housing, the coil comprising two coaxially nested tubes through which refrigerant vapor from the compressor and liquid to be heated pass in counterflow. The condenser coil may comprise an outer tube in which refrigerant flows and a coaxially nested tube in which the liquid to be heated flows, refrigerant entering at the upper end of the coil.

In another embodiment of the present invention, a heat pump installation is provided to utilize waste heat by transferring the waste heat where desired, such as to a room or to heat water. There are various sources of "waste" heat, such as that heat passing through a kitchen duct, laundry dryer duct, waste water from a washing machine, waste heat from a chicken brooding house, the exhaust gases from an internal combustion engine, and other like situations where heat is being exhausted to the atmosphere and would be considered waste heat.

This "waste" heat is transferred to a liquid reservoir by submerging the compressor and condenser coil in a liquid reservoir or bath. The liquid reservoir is heated by the refrigerant as it condenses and may be used to transfer the heat for useful purposes, such as hot water or to heat a room. By submerging the compressor and condenser in a liquid bath, the compressor is able to operate at lower temperatures. By submerging the compressor and condenser coil in a fluid bath, many substantial advantages are achieved. Since the electric motor of the compressor is operated at a lower temperature, the amount of electricity used by the compressor motor is decreased, the life of the compressor is increased and the heat generated by the operation of the compressor may be utilized.

Since the liquid bath maintains the compressor at a substantially uniform temperature during continued operation, the life of the compressor is extended. It is well known that rapid changes in the temperature of metals hastens fatigue and when metals are maintained at a constant temperature, metal fatigue is minimized. This embodiment of the present invention provides for utilizing the heat transferred to the liquid bath by transferring that heat to water to heat the water.

This embodiment also provides for selectively heating or cooling a room. In the heating mode, the heat is extracted from the source of "waste" heat and transferred to the room. Alternately in the cooling mode, heat is extracted from the room and transferred to the liquid bath. By submerging the compressor in the bath, the advantages described herein are also realized.

The accompanying drawings illustrate, purely diagrammatically and by way of example, typical practical embodiments of the invention.

DETAILED DESCRIPTION

The same reference numerals are used throughout the drawings to indicate the same or corresponding component parts.

Figure 1:
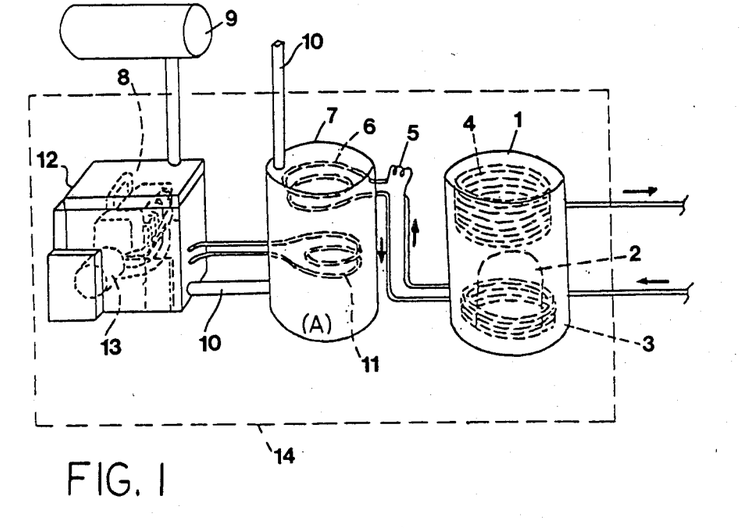
FIG. 1 shows diagrammatically the arrangement of a heat pump installation according to one embodiment of the invention, connected to a central heating system.

The heat pump installation shown in FIG. 1 has a water-filled heat pump tank 1 of which supplies hot water to a heating system, for example, the radiators of a central heating system, and/or hot water pipes for heating a greenhouse (not shown). Hot water is withdrawn from the upper part of the tank 1 and the return flow of water enters the lower part of the tank 1.

A sealed electric motor-compressor unit 2 is housed in the bottom of the heat pump tank 1 and is surrounded by a refrigerant pre-cooling coil 3. A condenser coil 4 is housed in the upper part of the heat pump tank 1.

The heat pump has a closed refrigerant circuit. Hot refrigerant vapor is delivered by the compressor unit 2 to the upper end of the condenser coil 4, in which the vapor condenses, giving up its heat to the water flowing in the heat pump tank 1. The cooled refrigerant liquid is then expanded through an expansion valve, capillary tube, or other pressure reducing device 5 and the resulting cooled refrigerant vapor, at low pressure, enters an evaporator coil 6 which, in this embodiment, is housed in the upper part of a separate heat exchanger tank 7. After picking up heat in the evaporator coil 6 the refrigerant gas, still at low pressure and at a relatively low temperature, flows through the pre-cooling coil 3 before re-entering the compressor unit 2. In effect, the heat pump transfers heat from a low grade source of heat at a relatively low temperature, that is, the warm water surrounding the evaporator coil 6, and delivers upgraded heat at a relatively higher temperature, that of the water surrounding the condenser coil 4.

The source of low grade heat for the heat pump installation consists in the present invention of an internal combustion engine 8, for example an Otto cycle engine running on propane gas or liquefied petroleum gas (LPG) stored under pressure in a tank 9, or methane derived from an effluent digester, according to the user's resources. The exhaust gases of the internal combustion engine 8 are ducted through a pipe 10 which in this embodiment passes through the heat exchanger tank 7, imparting heat to the evaporator coil 6. In addition, the internal combustion engine 8 has a liquid coolant circuit which is connected to a heat dissipation coil 11 located in the bottom of the heat exchanger tank 7.

The internal combustion engine 8 is enclosed in a sealed and acoustically insulated housing 12 and drives an electrical generator 13, also enclosed in the housing 12. Part of the output of the electrical generator 13 is used to drive the electric motor of the compressor unit 2.

The engine/generator housing 12, the heat exchanger tank 6 and the heat pump tank 1 are all enclosed in a common sound-proofed housing 14, shown diagrammatically in broken outline.

The heat pump installation utilizes a greater part of the heat generated by the internal combustion engine 8, which would otherwise be dissipated uselessly. In a typical practical installation a 500 cc gas driven engine 8 is used. After a short running time the temperature of the water in the heat exchanger tank 7 would have risen to about 50 degrees C., which will be the source temperature for the heat pump. The overall performance of the heat pump increases as the source temperature increases, and with a source temperature of about 50 degrees C. a coefficient of performance of about 5:1 can be expected. If the engine 8 is running on liquid petroleum gas (LPG) and using about three pounds of gas per hour, then the heat input to the engine would be about 60,000 BTU per hour, given a calorific value of LPG fuel of about 20,000 BTU per pound. A typical internal combustion engine converts about 65% of its energy input into heat, so that in this case about 39,000 BTU per hour would be dissipated as heat in the water in the heat exchanger tank 7. Given a coefficient of performance of 5:1, the maximum theoretical heat output from the heat pump installation would be 195,000 BTU per hour.

In practice, a considerable proportion of the total heat output of the internal combustion engine 8 would not be recoverable. Even if, however, only 50% of the available heat can be recovered in the heat exchanger tank 7 the heat delivered by the heat pump would be about 95,000 BTU per hour. This makes the installation extremely competitive compared with a central heating system of comparable size heated directly by the fuel used to power the internal combustion engine.

Figure 2:
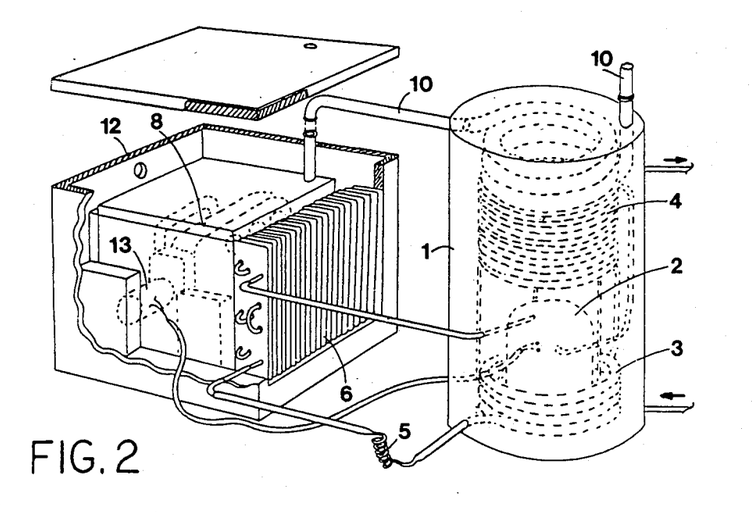
FIG. 2 shows diagrammatically and partly cut away a heat pump installation according to another embodiment of the invention.

FIG. 2 shows an alternative embodiment of the invention, in which the evaporator coil 6 is a finned heat-exchanger matrix located alongside the internal combustion engine 8 in heat exchange relation therewith. After picking up heat in the evaporator coil 6 the refrigerant gas, still at low pressure and at a relatively low temperature, enters the compressor unit 2. The exhaust gases of the engine 8 are again ducted through a pipe 10 which passes through the upper part of the heat pump tank 1, imparting heat directly to the water therein.

Figure 3:
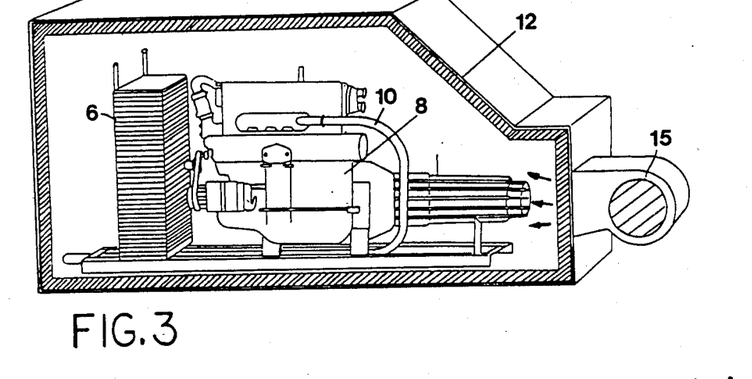
FIG. 3 is a diagrammatic cut-away view of an internal combustion engine and one of the evaporators of a heat pump installation according to the invention.

FIG. 3 shows an alternative to the arrangement illustrated in FIG. 2, in which the engine 8 and generator 13 are enclosed in a housing 12 lined with acoustically absorbent material. An electrically driven centrifugal impeller unit 15, powered by the generator 13, blows air over the generator 13 and the engine 8, and through the fins of an evaporator coil 6A, which is downstream of the engine 1. The evaporator coil 6A is part of a first heat pump 16A (FIG. 5) which absorbs specifically the waste heat generated by the engine 8 and generator 13, including heat imparted to the engine lubricating oil.

Figure 5:
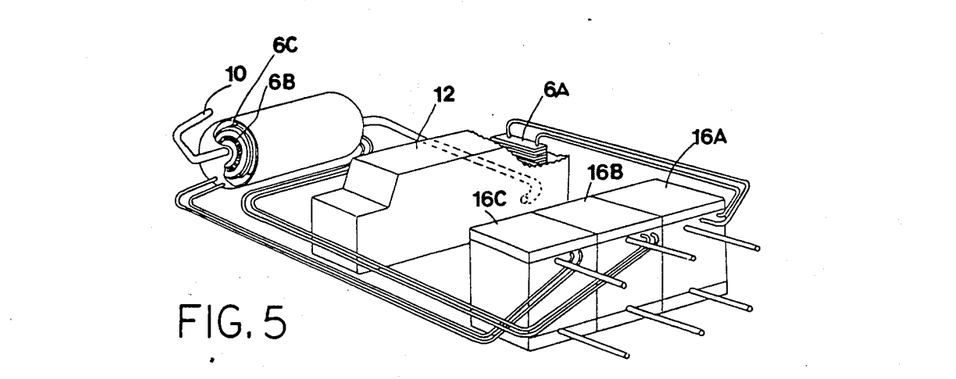
FIG. 5 is a schematic diagram showing a typical arrangement of an engine and heat pumps forming an installation according to the invention.

Two further heat pumps 16B, 16C, essentially similar to the heat pump 16A, and each arranged in a manner similar to the heat pump system described with reference to FIGS. 1 or 2, are arranged alongside the heat pump 16A. The heat pumps 16B, 16C are arranged to extract heat from the engine exhaust gases, which account for about 60% of the total heat loss from the engine.

Figure 4:
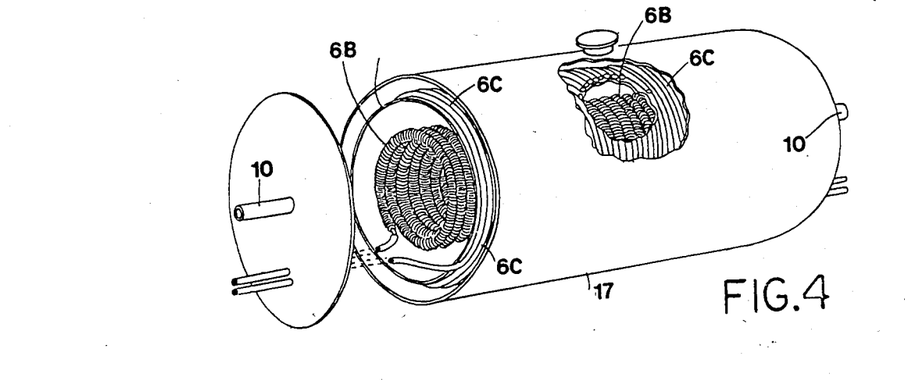
FIG. 4 is a cut-away perspective view of another of the evaporators employed in an installation according to the invention, for use in extracting heat from the engine exhaust gases.

For the purpose of extracting heat from the engine exhaust gases an evaporator coil 6B of finned or 'INTEGRON' (Trade Mark) tubing is provided in a cylindrical silencer chamber 17 through which the engine exhaust gases pass (FIG. 4), the finned tubing being exposed to the exhaust gases and serving both to absorb heat and to reflect internally acoustic energy from these gases. The evaporator coil 6B is surrounded by a cylindrical liner 18 which, with the wall of the chamber 17, defines an annular duct which is filled with static liquid (e.g. water). A third evaporator coil 6C, associated with the heat pump 16C, is immersed in the liquid in this duct. The evaporation of refrigerant in the coils 6B, 6C may in practice bring the gas temperature down to a level comparable with, or less than, ambient temperature, thereby avoiding the exhaust noise which would otherwise arise from the shock waves produced by hot air meeting cold air. The evaporator coil 6B is of such a diameter that the chamber 17 affords adequate expansion space for the exhaust gases, thereby further improving silencing, while at the same time presenting minimal flow restriction and back pressure in the engine exhaust system. The tubing forming the evaporator coil 6C has a total length of about three times the length of the tubing forming the evaporator coil 6B.

The use of the three heat exchangers and heat pumps 16A, 16B, 16C in tandem ensures a substantially constant source of heat for the heat pump installation, with an output scaled to the engine speed, which can be kept at a constant low value in a static installation, to minimize engine wear. Because of the high source temperature of the heat pump 6C connected to the evaporator coil 6B (typically about 110 degrees C.) the heat pump 6C is able to operate with a high coefficient of performance, of about 5:1.

The three heat pumps 16A, 16B, 16C together form a heat pump installation for the virtually total extraction of heat from an internal combustion engine. Hot coolant liquid from the engine coolant system flows into a common reservoir or tank which also receives hot water from the heat pumps, analogously to the heat pump tank 1 of the embodiment illustrated in FIGS. 1 and 2.

In the embodiments of the invention illustrated in FIGS. 1, 2 and 5, the engine 8 and generator 13 may be specially adapted, with suitable distributor, air supply, and electrical supply leads, for complete immersion in liquid within a housing 12, the liquid preferably being water mixed with soluble oil to inhibit corrosion. Heat is extracted from the liquid by a heat pump as earlier described. As well as improving heat transfer from the engine and generator, such an arrangement also affords a further improvement in sound insulation.

Figure 6:
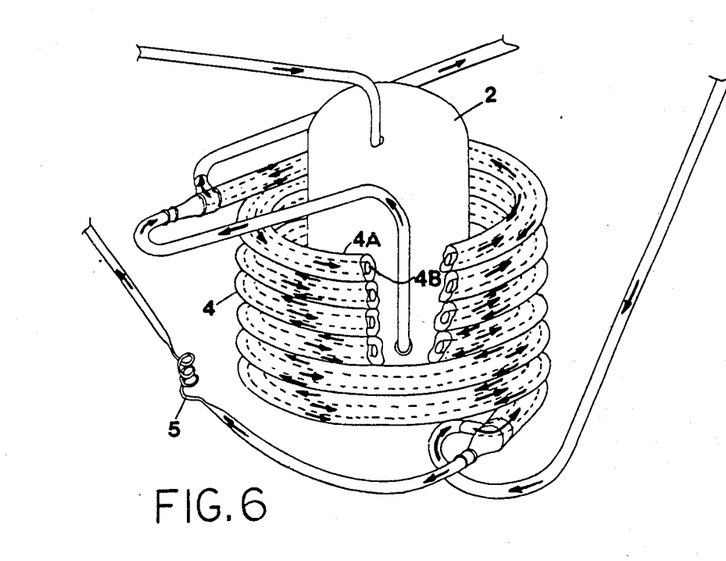
FIG. 6 is a cut-away perspective view of the compressor and condenser of a heat pump forming part of an installation according to an alternative embodiment of the invention.

FIG. 6 illustrates an alternative form of heat pump which may be used in installations according to the invention. The compressor unit 2 is surrounded by a condenser coil 4 which consists of two coaxially nested tubes, that is, an outer tube 4A and a coaxial inner tube 4B. Hot refrigerant vapor from the compressor enters the upper end of the coil 4 and flows in the annular duct between the outer and inner tubes 4A, 4B, while water to be heated flows in the opposite direction through the inner tube 4B. After condensing in the coil 4 the refrigerant, still under pressure, passes through an expansion device, in this case a capillary tube 5, and thence to an evaporator coil (not shown) which may be of the kind described previously with reference to FIGS. 1 to 4. The heated water leaving the upper end of the tube 4B flows into a hot water tank (not shown).

The coils of the tube 4 are lagged by at least 2 inches of glass-fibre insulation covered by reflective metal foil.

Figure 7:
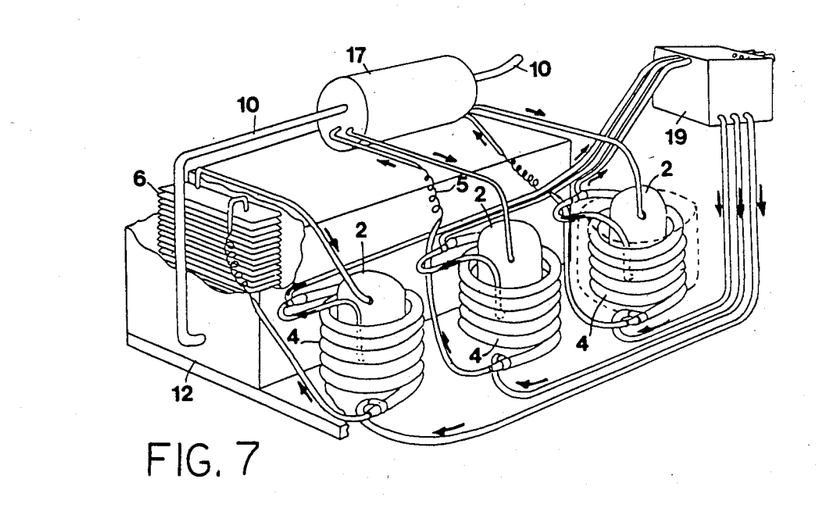
FIG. 7 is a schematic diagram of a heat pump installation utilizing heat pumps of the kind illustrated in FIG. 6.

FIG. 7 shows a typical heat pump installation, similar to that shown in FIG. 5, utilizing heat pumps of the kind illustrated in FIG. 6, the heat pumps being identified by the same reference numerals 16A, 16B, 16C as those employed in FIG. 5. The heated water from the respective condenser coils 4 of the heat pumps is collected in a common header tank 19 for distribution, for example, to hot water pipes or radiators in a heating system of a greenhouse. Water returns from the heating system to the bottom of the tank 19 from which it is withdrawn to enter the lower ends of the condenser coils 4, forming with the tank 19 respective closed heat exchange circuits.

Figure 8:
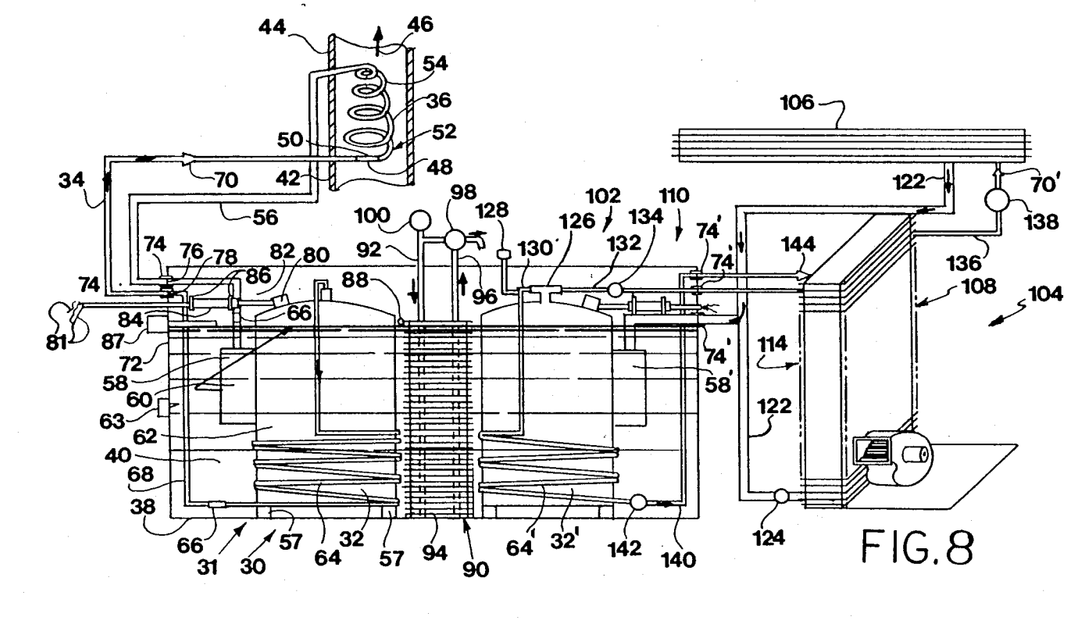
FIG. 8 is a schematic diagram of another embodiment of a heat pump installation of the present invention having a room evaporator/condenser unit.

Another embodiment of a heat pump installation of the present invention is shown in FIG. 8. The heat pump installation 30 is provided to transfer and utilize the "waste" heat passing through a kitchen duct, laundry dryer duct, waste water from a washing machine, the waste heat from a chicken brooding house, the exhaust gases from an internal combustion engine, and in other like situations where heat is being exhausted to the atmosphere and would be considered "waste" heat. In certain situations, even the heat in the atmosphere may also be used. The heat pump installation 30 transfers this heat to a liquid reservoir or bath 40 which in turn heats water used for sanitary, heating or other purposes. In addition, the heat pump installation 30, as shown in FIG. 8, is also used to selectively heat or cool a space, such as a room schematically indicated at 104.

The heat pump system 30 includes a first heat pump unit 31 which includes a compressor 32, a condenser 64, a refrigerant piping system 34, and an evaporator 36. The compressor 32 is positioned in a tank 38 having a liquid bath 40 therein for receiving heat from the refrigerant passing through the piping 34, the condenser 64 and also the heat generated by the operation of the compressor 32.

The evaporator 36 includes a helical coil of tubing 42 positioned in the exhaust duct 44 connected to a source of "waste" heat, such as kitchen appliances. The exhaust duct 44 conducts the "waste" heat from the various appliances in the kitchen through the duct 44 in a direction 46 to the atmosphere.

The helical coil of tubing 42 is formed from a tube 48 which readily transmits heat therethrough, such as a copper tube. The exterior surface of the tube 48 is coated with a coating material 50 which minimizes the collection of contaminants, such as dust and grease, from adhering to the coil 42 to thereby improve the thermal transfer characteristics of the evaporator 36 and allow the refrigerant passing through the evaporator to absorb a greater amount of heat. One coating material 50 is a synthetic resin polymer sold under the trademark TEFLON. The coating 50 on the coil 42 is also important to meet various governmental regulations concerning the collection of contaminants such as grease in the ducts passing through the flue.

The helical coil 42 is positioned in the exhaust duct 44 with the large diameter end 52 of the helical coil upstream of the small diameter end 54 of the helical coil. As the waste heat travels through the duct 44 in the direction 46, the large diameter end 52 of the coil 42 is initially contacted by the hot gas passing through the duct and funnels the hot gas through the helix creating a more turbulent air flow to maximize the amount of heat that is transferred to the refrigerant contained in the coil 42.

It should be recognized that other evaporators may be used, such as internal or external fin tubing. In the case of waste water from a washing machine, coaxial tubing of the type shown in FIG. 6 may be used as the evaporator 36. In this design, the heated water from the washing machine passes through the center of the central coaxial tube 4B and the refrigerant passes through the outer annular space between the tubes 4A and 4B of the coaxial tube to absorb "waste" heat from both the waste water and the atmosphere.

The evaporator 36 shown in FIG. 8 may also be of any construction known to those skilled in the art and is positioned in thermal contact with the source of "waste" heat referred to above.

A refrigerant fluid passes through the evaporator 36 from the inlet to the outlet. As the refrigerant passes through the evaporator 36, it absorbs heat from the "waste" heat source and changes from a liquefied state to a gaseous state. This process is commonly known as the vaporization phase.

The refrigerant then passes through the conduit 56 to the compressor 32 where the refrigerant is compressed and its pressure and heat are increased. An accumulator 58 is provided to receive the refrigerant from the tube 56 and super heat the refrigerant and subsequently transmit the super heated refrigerant to the compressor. It is important to completely vaporize the refrigerant before it is compressed by the compressor 32, since any refrigerant in a partially liquid state would contain some substantially incompressible liquid which will distort the discharge valve of the compressor 32 and put an extra load on the compressor motor thereby reducing the capacity of the compressor. The accumulator 58 is positioned in the liquid bath 40 which is at an elevated temperature a will be herein further described. The hot liquid bath 40 evaporates any liquid refrigerant in the accumulator 58 before the refrigerant is conducted to the compressor 32.

Depending on the operating characteristics of the system 30, the super heating of the returning refrigerant in the accumulator 58 may be overdone. Accordingly, insulation 60 is provided around the accumulator 58 to provide for proper super heating of the refrigerant. Of course, the amount of insulation 60 is dependent on the operating characteristics of the system. The fully vaporized refrigerant then passes to the compressor 32 where the refrigerant is compressed.

The compressor 32 includes a motor which is electrically connected to an electrical power source. The electrical connection between the compressor 32 and the electrical power source are sealed for immersion in the liquid bath 40. The electrical power lines are connected to the motor of the compressor 32 and are housed in a terminal housing 80 on the top of the casing 62. The terminal housing 80 is sealed to the case 62 in a waterproof manner. An outlet pipe 82 is connected to and sealed to the terminal housing 80. The electrical power lines 81 pass through the outlet pipe 82 to a position outside of the liquid tank 38 where they may be connected to the source of electrical power. The wire outlet pipe 82 is connected to an outer casing pipe 84 of heat proof flexible rubber. The outer casing rubber tube 84 is secured to the outlet pipe 82 by any conventional means, such as stainless steel hose clips 86. The compressor and motor of the compressor 32 are hermetically sealed in a steel casing 62 and positioned in the liquid bath 40.

The compressor 32 has shock absorbing rubber feet 57 which are in contact with the tank 38 to minimize the vibration during operation of the compressor 32. Since the compressor 32 can move, the conduits 34, including conduits 56, 68, preferably include flexible couplings 66 to allow for movement of the compressor 32 without damaging the conduits 34 leading to and from the compressor 32 and condenser 64.

The liquid bath 40 may be of any conventional liquid, such as water. The use of a liquid bath 40 provides for a more efficient transfer of heat and gaseous mediums are not as efficient or as simple in construction. When water is used, a water soluble oil or any other well known rust inhibitors are included in the bath 40 so as to minimize corrosion of the tank 38 and the components in the bath. To minimize any electrolysis which may exist between dissimilar metals, a grounded cathode may be inserted in the bath t minimize any electrolytic action. This is particularly helpful when the water is acetic in nature.

It should be understood that it is within the contemplation of this invention for the tank 38 to be a sealed tank which is completely full of liquid 40. In such a design, all electrical connections to the compressor 32 and the conduits 34 are sealed from the fluid bath 40.

When it is not necessary to use a sealed container, the level of the liquid bath 40 is maintained at a predetermined level. The float switch 87 is provided which senses the level of the bath 40 and operates a solenoid water inlet valve. The float switch 87 operates the water inlet valve when the fluid level goes below the predetermined level and shuts the water inlet valve off when the proper level is reached. A drain pipe 88 extends through the wall 72 of the tank 38. If the level of liquid 40 in the tank 38 exceeds the predetermined level, the liquid 40 flows through the drain pipe 88.

By submerging the hermetically sealed compressor 32 in the liquid bath 40, several important objectives are achieved. In general, rotary compressors run at a temperature exceeding 200 degrees Fahrenheit and the electric motor which drives them will be at a temperature even higher than that. It is well known that the efficiency of any electric motor decreases with a rise in temperature and consequently uses more electricity. The compressed refrigerant which has had work done on it by being compressed by the compressor 32 will rise in temperatures to over 240 degrees Fahrenheit. This temperature is of no advantage to the motor of the compressor 32 since it is a purpose of the system 30 to transfer heat at an advantage from one location to another.

The liquid bath 40 maintains the compressor 32 at a lower temperature which increases the efficiency of operation of the hermetically sealed compressor. When an electric motor operates at higher temperatures, greater amounts of electrical energy are required to obtain the same performance of the electric motor than when it operates at a lower temperature. By providing the bath 40 to maintain the compressor 32 at a lower temperature, less electric energy is required to operate the compressor. Further, by operating the compressor at a lower temperature, its efficiency and operating performance is improved.

Another important advantage is that by submerging the hermetically sealed compressor 32 in the liquid bath 40, the operating temperature of the compressor remains constant which substantially increases the life of the hermetically sealed compressor.

In one heat pump unit 31 constructed in accordance with the present invention by using a wasteheat source temperature greater than 120 degrees Fahrenheit, the coefficient of performance is at least 6 to 1.

At this point it is important to recognize that the liquid bath 40 surrounding the hermetically sealed compressor is of a substantial size so that it receives substantially all of the heat herein described and operates to advantageously utilize this heat, such as for example, heating water. It should be understood that the size of the liquid bath 40 is sufficiently large to create a "fly wheel" effect and is capable of absorbing and storing substantial quantities of heat in the bath until the heat is withdrawn from the bath as will be hereinafter described. The constant temperature of the bath 40 and compressor 32 minimizes the effects of the difference in the coefficient of expansion and contraction of the various metals comprising the compressor 32 and consequently the metal fatigue as a result of the expansion and contraction of those metals.

Another significant advantage of submerging the hermetically sealed compressor 32 in the liquid bath 40 is that the heat generated as a result of mechanical inefficiencies (such as bearing friction and other frictional heat losses, motor slip, electrical resistance) is received by the bath 40 and utilized as will be herein described.

Another important advantage obtained by submerging the hermetically sealed compressor unit 32 in the liquid bath 40 is that the noise of operation and any vibration is dampened by the liquid so that a heat transfer unit 30 constructed in accordance with the present invention is quiet in operation.

Furthermore, by submerging the heat transfer element 94, 64 in the bath 40, the heat is transferred by the bath 40 without requiring complicated mechanisms to transfer the heat between those elements. This important design feature promotes a uniform temperature of the bath 40 as heat is put into the bath and taken from the bath. If different baths were used and heat conducted between the baths, a uniform temperature, efficient transfer of heat and minimum cost of construction would not be achieved.

After the refrigerant is compressed by the hermetically sealed compressor 32, it will have risen in temperature to over 240 degrees Fahrenheit. It is desirable to cool the heated refrigerant as quickly as possible to achieve the advantages described herein. The refrigerant then passes to a condenser coil 64 which is submerged in the liquid bath 40. As shown in FIG. 8, the condenser coil 64 is positioned around the outside of the casing 62 of the hermetically sealed compressor 32. In the condenser 64, the refrigerant changes from a compressed vapor to a liquid and transfers its heat to the liquid bath 40 and the refrigerant condenses to a liquid. Accordingly, heat is received by the liquid bath 40.

Because of the low temperature of the saturated refrigerant gas and its mass flow of over 1,000 pounds per hour and the fact that the compressor 32 and condenser 64 are immersed in the liquid bath 40, temperatures of the bath of over 180 degrees Fahrenheit may be achieved if desired for obtaining sterilizing water at 180° degrees Fahrenheit. In general, it has been found preferable to operate the bath 40 in the range from about 150 degrees Fahrenheit to about 180 degrees Fahrenheit.

A temperature sensor 63 is provided to control the compressor 32. When the bath 40 reaches the desired temperature the sensor 63 turns the compressor 32 off. Conversely, when the bath 40 falls below a predetermined temperature, the sensor 63 turns the compressor 32 on. It should be understood that the compressor 32 has an internal relay to turn the compressor off if its temperature exceeds a predetermined level.

After the refrigerant passes through the condenser 64, it is conducted through the valve 66 to the evaporator 36 by the conduit 68. The conduit 68 includes an expansion device 70, such as an expansion valve or a capillary tube. A typical refrigerant will have a liquid temperature of approximately 120 degrees Fahrenheit and after it passes through the expansion device 70 will be reduced in pressure to approximately 40 PSI and a temperature of approximately 43 degrees Fahrenheit. The refrigerant then passes through the evaporator 36 as described above.

The conduits 56 and 68 which conduct the refrigerant from the evaporator 36 to the compressor 32 and subsequently from the condenser 64 to the evaporator 36, pass through the wall of the tank 38 containing the liquid bath 40. These conduits may be made of any known material, such as copper, and have a substantial coefficient of expansion and contraction. Such materials harden with work and as they expand and contract, harder and tend to split or crack. In order to minimize the stresses on the conduits 56 and 68 as they pass through the wall 72 of the tank 38, the resilient grommet members or resilient sleeves 74 are provided. The grommet members 74 are positioned between their conduits 56 and 68 and their respective openings 76, 78 in the tank wall 72. The grommets 74 may be made from any conventional resilient material capable of operation at elevated temperatures and capable of sealing moisture. The grommets 74 allow the conduits 56, 68 to pass through their respective openings 76, 78 in the tank wall 72 and seal the tank 38 while allowing for expansion and contraction of the conduits 56, 68. Accordingly, the stresses on the conduits 56, 68 as they pass through the wall 72 of the tank 38 are minimized.

The heat pump installation 30 of the present invention shown in FIG. 8, is capable of transferring the "waste" heat to the bath 40 where the heat may be utilized; for example heating water. After water is heated, it may be used for many various purposes such as washing dishes, heating a room or any other use of heated water.

The heat pump installation 30 of the present invention includes means for extracting heat from the bath 40, such as a water heating unit 90. The water heating unit 90 includes an inlet conduit 92, a heat exchanger coil 94, an outlet conduit 96 and a mixing valve 98. A source of water 100 is connected to the conduit 92 and conducts water to be heated into the heat exchanger 94 and to the mixing valve 98. The heat exchanger 94 may be of any conventional construction, such as a coil of finned tubing. The heat exchanger 94 receives water to be heated from the source 100. The heat exchanger 94 is submerged in the liquid tank 38. Heat from the liquid 40 in the tank 38 is transferred to the water from the source 100 without contamination of that water.

After the water is heated, it passes out of the heat exchanger 94 through the conduit 96 to a storage vessel or alternately to the appliance or faucet where it is to be used. In other cases the heater water may be conducted to a radiator to heat a room.

In some instances, it is required to use water heated to 180 degrees Fahrenheit to sterilize cooking and dining utensils, etc. In other uses of the heated water, it may be used to wash hands, etc. In this type of use, the water may not be of such a great temperature so as to scald one's hands, etc.

Since the temperature of the fluid bath 40 may reach 185 degrees Fahrenheit, it is possible for the water heated in the heat exchanger 94 to achieve higher temperatures than that required for proper use. Accordingly, the mixing valve 98 is connected by the conduit 96 to the water leaving the heat exchanger 94 and also to the water source 100 which generally has cooler water at generally ambient temperature. The mixing valve 98 mixes the water from the source 100 and the water heated by the heat exchanger 94 to a predetermined temperature so that the heated water is supplied to the appliance or faucet at the desired temperature.

In one water heating application, a liquid bath 40 of 26 gallons was provided and found to have a sufficient "fly wheel" effect to maintain a constant temperature.

It should also be understood that it is within the contemplation of this invention to circulate the fluid 40 in the tank 38 to a water tank having a secondary coil or heat exchanger and heat water in the tank thereby.

The heat pump installation 30 of the present invention shown in FIG. 8 also includes an air conditioning heat pump unit 102 capable of selectively heating or cooling an enclosed space, such as a room in a building, schematically indicated at 104. The air conditioning heat pump unit may be used to heat the liquid bath 40 up to temperatures of approximately 180 degrees Fahrenheit or air at predetermined volumes up to 130 degrees Fahrenheit as well as cool air down at 50 degrees Fahrenheit.

The air conditioning heat pump unit 102 includes a compressor 32' with condenser coils 64', an evaporator 106 and an evaporator/condenser unit 108 positioned in the room 104. The air conditioning heat pump unit 102 also includes valving and conduit means, generally indicated at 110, for operation of the evaporator/condenser unit in either a heating or cooling mode, as will be herein further described.

In describing the air conditioning heat pump unit 102, components that are similar to the components described in connection with the heat pump unit 31 will be designated by the same numeral followed by a prime (') mark.

The evaporator 106 is similar in construction to the evaporator 36 described above and is utilized to draw heat from a source of "waste" heat or the atmosphere so that the air conditioning unit 102 transfers that heat to the room 104 when in the heating mode. In the cooling mode, the evaporator/condenser 108 extracts heat from the room 104 which heat is transferred to the liquid bath 40 where that heat may be used, such as for example, heating water.

Figure 9:
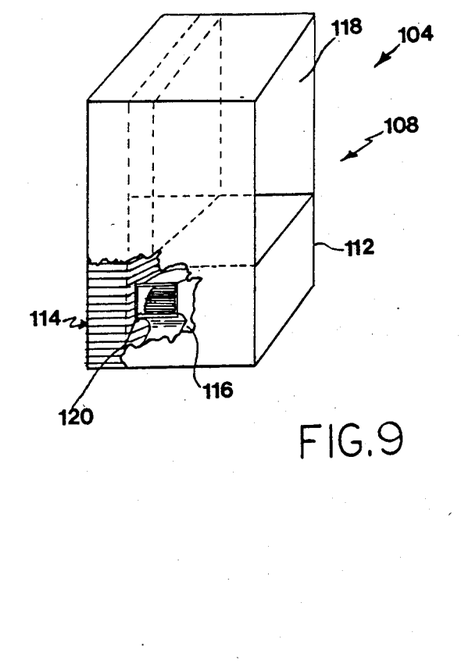
FIG. 9 is a cut-away perspective view of the room evaporator/condenser unit of the heat pump installation shown in FIG. 8.

The evaporator/condenser unit 108, as seen in FIGS. 8 and 9, includes an enclosure 112 which is positioned on the floor of the room 104. The evaporator/condenser unit includes an evaporator/condenser coil 114 of finned tubing and a motor driven fan 116. The evaporator/condenser coil 114 may be of any known construction that provides for the flow of refrigerant therethrough to selectively extract heat from the room 104 or heat the room. The enclosure 112 includes an opening 118 which allows air from the room to enter the enclosure 112 and pass over the evaporator/condenser coil 114. When in operation, the fan 116 creates a negative pressure in the enclosure 112 causing air to enter through the opening 118. The fan 116 is electrically driven by any known means. It should be understood that a plurality of fans may be provided and may have speed controls so that the volume and consequently temperature of the air may be adjusted.

The electrically driven fan 116 has an air discharge outlet 120 and operates to draw air through the opening 118, across the evaporator/condenser coil 114 and expel that air through the outlet 120 into the room 104. By so drawing air from the room across the coil 114, a more uniform movement of air across the coils 114 is provided to thereby more efficiently utilize the heat transfer capabilities of the evaporator/condenser coil 114.

By positioning the evaporator/condenser unit 108 on the floor of the room 104 when in the cooling mode, cool air is expelled at the floor level driving the heated air to the ceiling and thereby more efficiently cool the room. In the heating mode, the heated air is expelled at floor level to provide a more uniform heating of the room since the cooler air closer to the floor of the room is heated by the evaporator/condenser unit 108 and a greater temperature differential exists between the air being heated and the hot refrigerant in the evaporator/condenser coil 114. In one such application the air passing through the coil 114 was heated to approximately 110 degrees Fahrenheit at a volume of approximately 1500 CFM. Of course, it should be understood that the lower the volume of the air passing over the coil 114, the higher its temperature will be.

In the heating mode, the air conditioning unit 102 extracts heat from a source of "waste" heat or the atmosphere by passing a refrigerant through the evaporator 106 which is similar in construction to the evaporator 36. The heated refrigerant passes through the conduit 122 to the accumulator 58'. The valve 124 in the conduit 122 is in a closed position to prohibit the heated refrigerant from flowing to the evaporator/condenser unit 108.

The compressor 32' receives the super heated refrigerant from the accumulator 58' and compresses the refrigerant which is then delivered to the supply tee connection 126. The valve 128 is positioned on the refrigerant inlet side 130 of the condenser coil 64'. In the heating mode, the valve 128 is in a closed position to prohibit hot compressed refrigerant from flowing through the condenser coil 64'.

The conduit 132 interconnects the outlet tee 126 to the evaporator/condenser coil 114. The valve 134 in the conduit 132 is in an open position to allow heated compressed refrigerant to flow through the conduit 132 into the evaporator/condenser coil 114. As air in the room 104 passes across the evaporator/condenser coil 114, the hot compressed refrigerant is cooled and the heat is transferred into the room 104.

After the refrigerant condenses in the coil 114 into a liquid, it is conducted from the evaporator/condenser coil 114 to the evaporator 106 through the conduit 136. The valve 138 in the conduit 136 is in an open position to allow the liquid refrigerant to flow to the evaporator 106. An expansion device 70' is provided and operates in a manner similar to that described in connection with the expansion device 70. The refrigerant passes through the expansion device 70' and into the evaporator 106 where the refrigerant is heated by the "waste" heat source or atmosphere as described above in connection with the evaporator 36.

In the cooling mode, the valve 134 is in a closed position and prohibits the flow of hot compressed refrigerant through the conduit 132. The valve 128 is in an open position to allow the hot compressed refrigerant to flow through the condenser coil 64'. The fluid bath 40 condenses the refrigerant and absorbs the heat therefrom in a manner similar to that described in connection with the compressor 32 and condenser coil 34. Accordingly, the bath 40 may be heated to temperatures from between approximately 150 degrees Fahrenheit to 180 degrees Fahrenheit.

The conduit 140 connects the condenser coil 64' and the evaporator/condenser coil 114 to conduct the condensed refrigerant from the coil 64' to the coil 114. In the cooling mode, the valve 142 in the conduit 140 is in an open position to allow the liquefied refrigerant to flow through the conduit 140. It should be understood that the valve 142 is in a closed position when the air conditioning unit 102 is in a heating mode, so as to prohibit the flow of refrigerant through the condenser coil 64'.

When in the cooling mode, the conduit 140 conducts the liquid refrigerant to an expansion device 144 which operates in a manner similar to that of the expansion devices 70 and 70'. A typical refrigerant will have a pressure of approximately 47 PSI and a temperature of approximately 50 degrees Fahrenheit after it passes through the expansion device 144. The expansion device 144 delivers the refrigerant to the evaporator/condenser coil 114 where the refrigerant absorbs heat from the room 104 as a result of the air in the room passing across the evaporator/condenser coils as herein described. In addition, when the air is so cooled it is also dehumidified.

In the cooling mode, the valve 138 is in a closed position to prohibit flow of the heated gaseous refrigerant through the conduit 136 to the evaporator 106 and likewise the valve 134 is in a closed position to block the flow of refrigerant through the conduit 132. The conduit 122 is connected to the evaporator/condenser coil 114 and conducts the heated refrigerant through the valve 124, which is in an open position in the cooling mode, to the accumulator 58'. The accumulator 58' super heats the refrigerant as described in connection with the accumulator 58. The super heated refrigerant is then conducted to the compressor 32' where it is compressed and delivered to the condenser coil 64' as herein described.

The compressor 32' is connected to a source of electrical power in a manner similar to that described in connection with the components 80, 82, 84, 86, which are described in connection with the compressor 32. It should also be understood that the conduits 122, 132 and 140 pass through the wall 72 of the tank 38 through the grommets 74' in a manner similar to that described in connection with the grommets 74 and their respective conduits.

It should further be understood that the valves 124, 128, 134, 138, 142 are operated electrically by solenoids and receive their signals from a room thermostat which will change the air conditioning unit 102 between the heating and cooling modes according to the setting of the thermostat.

Having described my invention, I claim:

1. A heat pump installation including a first heat pump comprising a compressor, condenser and evaporator and utilizing as a source of waste heat waste heat exhaust through a duct, with the evaporator being positioned in such duct, said installation comprising a tank of liquid in which the compressor and condenser are immersed, and a second heat pump including a compressor, condenser and evaporator for room heating or air conditioning with the compressor and condenser thereof also immersed in the liquid of said tank.

2. A heat pump installation as set forth in claim 1 including a heat exchanger also immersed in said tank operative to heat water.

3. A heat pump installation as set forth in claim 2 wherein said heat exchanger includes a water inlet and a water outlet with a mixing valve therebetween so that water at the outlet is heated to a selected temperature.

4. A heat pump installation as set forth in claim 1 including means to control the level of liquid in said tank.

5. A heat pump installation as set forth in claim 1 including a temperature sensor in such liquid operative to control the compressor of one of said heat pumps.

6. A heat pump installation as set forth in claim 1 wherein at least one of said heat pumps includes an accumulator between said condenser and compressor immersed in said liquid operative to superheat the refrigerant before entering the compressor.

7. A heat pump as set forth in claim 6 wherein said accumulator is mounted on said compressor and is insulated.

8. A heat pump installation as set forth in claim 1 wherein the compressor and condenser units of said first and second heat pumps are mounted in said tank on vibration isolating feet.

9. A heat pump installation including at least three heat pumps each including a compressor, condenser and evaporator, said heat pump installation utilizing as a source of low grade heat waste heat generated by an internal combustion engine and including as such source of low grade heat at least two heat exchangers, one of said heat exchangers arranged to extract heat from the exhaust gases of the internal combustion engine and the other from the engine coolant system such that one of said heat exchangers for extracting heat from the exhaust gases includes two coils each forming the evaporator of separate heat pumps and any one of said heat exchangers comprises an inner chamber through which such exhaust gases are ducted, an outer chamber surrounding said inner chamber, and evaporator coils in both said inner and outer chambers.

10. A heat pump installation comprising at least three heat pumps each having a compressor, condenser and evaporator for refrigerant, at least one of said condensers comprising coaxial tubing with a liquid to be heated flowing in one direction in the outer tubing and a refrigerant flowing in the opposite direction in the inner tubing, said heat pumps each utilizing as a source of low grade heat waste heat generated by an internal combustion engine and including as such source of low grade heat at least two heat exchangers, one of said heat exchangers arranged to extract heat from the exhaust gases of the internal combustion engine and the other of said heat exchangers arranged to extract heat from the exhaust gases of the internal combustion engine and the other of said heat exchangers arranged to extract heat from the engine coolant system, said heat exchangers forming the evaporators of respective heat pumps, said one of said heat exchangers arranged to extract heat from the exhaust gases including two coils each forming the evaporator of separate heat pumps, and at least one of said heat exchangers including an inner chamber through which such exhaust gases are ducted, an outer chamber surrounding said inner chamber, and evaporator coils in both said inner and outer chambers.

11. In a heat pump installation, including a compressor, condenser and evaporator, utilizing as a source of waste heat, waste heat in a duct from a kitchen appliance or the like, said evaporator being positioned in said duct and comprising a coil formed into a conical shape, said compressor and said condenser being immersed in a liquid bath, said liquid bath including therein a second heat pump for a room heating or air conditioning system.

12. A heat pump installation as set forth in claim 9 wherein the coil in said inner chamber is finned tubing exposed to such exhaust gases both to absorb heat and reflect internally acoustic energy.

13. A heat pump installation as set forth in claim 9 wherein said outer chamber is filled with liquid.

14. A heat pump installation as set forth in claim 13 wherein said chambers are generally cylindrical and coaxial.

15. A heat pump installation as set forth in claim 14 wherein the tubing forming the coils in the inner and outer chambers have a length ratio of about 1 to 3 respectively.

* * * * *